US00RE41904E

(19) United States
(12) Reissued Patent
Barry

(10) Patent Number: US RE41,904 E
(45) Date of Reissued Patent: Oct. 26, 2010

(54) METHODS AND APPARATUS FOR PROVIDING DIRECT MEMORY ACCESS CONTROL

(75) Inventor: Edwin Franklin Barry, Vilas, NC (US)

(73) Assignee: Altera Corporation, San Jose, CA (US)

(21) Appl. No.: 11/526,296

(22) Filed: Sep. 22, 2006

Related U.S. Patent Documents

Reissue of:
(64) Patent No.: 6,453,367
Issued: Sep. 17, 2002
Appl. No.: 09/854,789
Filed: May 14, 2001

U.S. Applications:
(

(62) Division of application No. 09/472,372, filed on Dec. 23, 1999, now Pat. No. 6,256,683
(60) Provisional application No. 60/113,637, filed on Dec. 23, 1998.

(51) Int. Cl.
*G06F 13/28* (2006.01)
G06F 9/26

(52) U.S. Cl. ..... 710/26; 711/203
(58) Field of Classification Search ..... 710/26, 710/22–25, 27–35; 711/16, 203, 200–207; 712/22, 200, 24, 245, 209
See application file for complete search history.

(56) References Cited

U.S. PATENT DOCUMENTS 3,593,306 A * 7/1971 Toy ..... 712/241
4,538,241 A 8/1985 Levin et al.
4,783,736 A * 11/1988 Ziegler et al. ..... 711/130
4,794,521 A * 12/1988 Ziegler et al. ..... 711/130
5,165,023 A 11/1992 Gifford
5,301,287 A 4/1994 Herrell et al.
5,418,970 A 5/1995 Gifford
5,579,493 A * 11/1996 Kiuchi et al. ..... 712/207
5,655,151 A 8/1997 Bowes et al.
5,659,798 A 8/1997 Blumrich et al.
5,698,913 A 12/1997 Yagi et al.
5,758,182 A 5/1998 Rosenthal et al.
5,784,706 A 7/1998 Oberlin et al.
5,802,554 A 9/1998 Caceres et al.
5,802,604 A 9/1998 Stewart et al.
5,828,856 A 10/1998 Bowes et al.
5,828,903 A 10/1998 Sethuram et al.
5,860,025 A 1/1999 Roberts et al.
5,864,876 A 1/1999 Rossum et al.
5,890,201 A 3/1999 McLellan et al.
5,958,048 A * 9/1999 Babaian et al. ..... 712/241
6,047,307 A 4/2000 Radko
6,058,437 A 5/2000 Park et al.
6,081,854 A 6/2000 Priem et al.
6,145,076 A * 11/2000 Gabzdyl et al. ..... 712/241
6,256,683 B1 7/2001 Barry
6,260,082 B1 7/2001 Barry et al.

* cited by examiner

*Primary Examiner*—Christopher B Shin
(74) *Attorney, Agent, or Firm*—Priest & Goldstein, PLLC

(57) ABSTRACT

Techniques are described for providing mechanisms of data distribution to and collection of data from multiple memories in a data processing system. The system may suitably be a manifold array (ManArray) processing system employing an array of processing elements. Virtual to physical processing element (PE) identifier translation is employed in conjunction with a ManArray PE interconnection topology to support a variety of communication models, such as hypercube and such. Also, PE addressing nodes are based upon logically nested parameterized loops. Mechanisms for updating loop parameters, as well as exemplary instruction formats are also described.

13 Claims, 19 Drawing Sheets

| VIRTUAL PE ID | PHYSICAL PE ID |
|---|---|
| 0 | 1 |
| 1 | 2 |
| 2 | 3 |
| 3 | 0 |

FIG. 8

800

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| 00 | | 0110 | | | | MA TYPE 01 | | (USED FOR 2x4 TRANSLATE TABLE) | | | | | | | | | | | | | | | | 2x2 TABLE | | | | | | | |
| (USED FOR 4x4 TRANSLATE TABLE) | | | | | | | | | | | | | | | | | | | | | | | | | | | | | | | |
| | | | | | | | | | | | | | | | | | | | | | | | | | | | | | | | |

| | |
|---|---|
| 2x2 TABLE | CONTAINS A TABLE OF TWO BIT PE IDs. A SEQUENCE OF TWO BIT VALUES (STARTING WITH 0) WHICH SPECIFY THE PE VID, ARE APPLIED AS AN INDICES INTO THIS TABLE WHEN ONE OF THE PE ADDRESSING MODES IS USED IN A TRANSFER INSTRUCTION. THE TRANSLATED VALUE IS THEN USED TO PERFORM THE MEMORY ACCESS. WITH THIS APPROACH, PEs MAY BE ACCESSED IN ANY ORDER FOR THESE MODES. |
| MA TYPE | ManArray TYPE SPECIFIES THE CONFIGURATION TARGETED AND THEREFORE THE SIZE OF THE TABLE.<br>00 - 1x2 (UP TO 2 PEs)<br>01 - 2x2 (UP TO 4 PEs)<br>10 - 2x4 (UP TO 8 PEs)<br>11 - 4x4 (UP TO 16 PEs) |

FIG. 9

900

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| USED FOR PE ID TRANSLATION TABLES LARGER THAN 4 ELEMENTS | | | | | | | | | | | | | | | | | | | | | | | | PID3 | | PID2 | | PID1 | | PID0 | |

FIG. 13

1300

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| CTU TRANSFER | | | | | I/O | TYPE | | BLOCKCYCLIC | | | | X | RSVD | | | CORE TRANSFER COUNT (CTC) | | | | | | | | | | | | | | | |
| RESERVED | | | | | | | | | | | | | | | | STARTING TRANSFER ADDRESS (WITHIN PE MEMORY) | | | | | | | | | | | | | | | |
| LOOP CTRL | | | | PE COUNT | | | | BASE UPDATE COUNT RANGE: 1 TO 256 | | | | | | | | BASE UPDATE (STRIDE) RANGE: | | | | | | | | | | | | | | | |
| INDEX COUNT (HOLD) RANGE: | | | | | | | | | | | | | | | | RESERVED | | | | | | | | INDEX UPDATE RANGE: 1-256 | | | | | | | |

| | |
|---|---|
| LOOP CTRL | LOOP CTRL SPECIFIES A PARTICULAR ORDER IN WHICH PE, BASE AND INDEX VALUES ARE UPDATED. THREE POSSIBLE ORDERS ARE SELECTABLE WHICH CORRESPOND TO THREE ASSIGNMENTS OF PE, BASE AND INDEX UPDATE TO THREE NESTED CONTROL LOOPS (OUTER, MIDDLE AND INNER).<br>00 - BASE (OUTER), INDEX (MIDDLE), PE (INNER) - BIP<br>01 - BASE (OUTER), PE (MIDDLE), INDEX (INNER) - BPI<br>10 - PE (OUTER), BASE (MIDDLE), INDEX (INNER) - PBI |
| PE COUNT | SPECIFIES THE NUMBER OF PEs TO BE ACCESSED FOR EACH TIME THE PE COUNTER IS SIGNALED TO RELOAD. VALID VALUES ARE:<br>0000 - MAX NUMBER OF PEs AS SPECIFIED IN THE PE CONFIGURATION REGISTER<br>0001 - 1<br>0010 - 2<br>0011 - 3 ETC., ETC. |
| BASE UPDATE (STRIDE) | DISTANCE BETWEEN SUCCESSIVE BLOCKS. UNITS ARE OF "DATA TYPE" SIZE. |
| BASE UPDATE COUNT | USED FOR PBI LOOP CONTROL. SPECIFIES THE NUMBER OF TIMES THE BASE IS UPDATED BEFORE EXITING TO THE OUTER LOOP (PE UPDATE). RANGE IS 1 TO 256. |
| | |
| INDEX COUNT (HOLD) | NUMBER OF CONTIGUOUS DATA ITEMS IN A BLOCK |
| INDEX UPDATE | DISTANCE BETWEEN SUCCESSIVE ITEMS WITHIN A BLOCK. UNITS ARE OF "TYPE" SIZE. |

FIG. 14

1400

| LOOP CONTROL: BIP (PE ID VARIES FIRST, THEN INDEX, THEN BASE) | | | | |
|---|---|---|---|---|
| ADDRESS | PE0 | PE1 | PE2 | PE3 |
| 0x0000 | 0 | 1 | 2 | 3 |
| 0x0001 | | | | |
| 0x0002 | 4 | 5 | 6 | 7 |
| 0x0003 | | | | |
| 0x0004 | | | | |
| 0x0005 | | | | |
| 0x0006 | | | | |
| 0x0007 | | | | |
| 0x0008 | 8 | 9 | 10 | 11 |
| 0x0009 | | | | |
| 0x000a | 12 | 13 | 14 | 15 |

- AN INBOUND SEQUENCE OF 16 DATA ELEMENTS WITH VALUES 0,1,2,3,...15
- PETABLE SETTING OF 0x000000E4 (NO TRANSLATION OF PE IDs)
- TSI.block INSTRUCTION IN THE STU (READING THE 16 VALUES FROM SYSTEM MEMORY)
- TCI.blockcyclic INSTRUCTION IN THE CTU WITH PE COUNT = 4, LOOP CONTROL = BIP, BASE UPDATE = 8, BASE COUNT =, INDEX UPDATE = 2, INDEX COUNT = 2

FIG. 15

1500

| LOOP CONTROL: BPI (INDEX VARIES FIRST, THEN PE ID, THEN BASE) | | | | |
|---|---|---|---|---|
| ADDRESS | PE0 | PE1 | PE2 | PE3 |
| 0x0000 | 0 | 2 | 4 | 6 |
| 0x0001 | | | | |
| 0x0002 | 1 | 3 | 5 | 7 |
| 0x0003 | | | | |
| 0x0004 | | | | |
| 0x0005 | | | | |
| 0x0006 | | | | |
| 0x0007 | | | | |
| 0x0008 | 8 | 10 | 12 | 14 |
| 0x0009 | | | | |
| 0x000a | 9 | 11 | 13 | 15 |

- AN INBOUND SEQUENCE OF 16 DATA ELEMENTS WITH VALUES 0,1,2,3,...15
- PETABLE SETTING OF 0x000000E4 (NO TRANSLATION OF PE IDs)
- TSI.block INSTRUCTION IN THE STU (READING THE 16 VALUES FROM SYSTEM MEMORY)
- TCI.blockcyclic INSTRUCTION IN THE CTU WITH PE COUNT = 4, LOOP CONTROL = BPI, BASE UPDATE = 8, BASE COUNT =, INDEX UPDATE = 2, INDEX COUNT = 2

FIG. 16

1600

| LOOP CONTROL: PBI (INDEX VARIES FIRST, THEN BASE, THEN PE ID) | | | | |
|---|---|---|---|---|
| ADDRESS | PE0 | PE1 | PE2 | PE3 |
| 0x0000 | 0 | 4 | 8 | 12 |
| 0x0001 | | | | |
| 0x0002 | 1 | 5 | 9 | 13 |
| 0x0003 | | | | |
| 0x0004 | | | | |
| 0x0005 | | | | |
| 0x0006 | | | | |
| 0x0007 | | | | |
| 0x0008 | 2 | 6 | 10 | 14 |
| 0x0009 | | | | |
| 0x000a | 3 | 7 | 11 | 15 |

- AN INBOUND SEQUENCE OF 16 DATA ELEMENTS WITH VALUES 0,1,2,3,...15
- PETABLE SETTING OF 0x000000E4 (NO TRANSLATION OF PE IDs)
- ISI.block INSTRUCTION IN THE STU (READING THE 16 VALUES FROM SYSTEM MEMORY)
- ICI.blockcyclic INSTRUCTION IN THE CTU WITH PE COUNT = 4, LOOP CONTROL = BPI, BASE UPDATE = 8, BASE COUNT =, INDEX UPDATE = 2, INDEX COUNT = 2

NOTE THAT A FOR PBI MODE, THE BASE COUNT MUST BE 2 IN ORDER TO GET 2 "BLOCKS" OF DATA. INDEX COUNT CORRESPONDES TO THE NUMBER OF ELEMENTS WRITTEN BEFORE UPDATING THE NEXT ADDRESS VARIABLE. THE GAP BETWEEN ELEMENTS WITHIN A PE IS DUE TO THE INDEX UPDATE VALUE OF 2 (RATHER THAN 1)

FIG. 17

1700

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| CTU TRANSFER | | | | | I/O | TYPE | | PE SELECT INDEX | | | | X | RSVD | | | CORE TRANSFER COUNT (CTC) | | | | | | | | | | | | | | | |
| INDEX COUNT | | | | RESERVED | | | | | | | | | | | | STARTING TRANSFER ADDRESS (WITHIN PE MEMORY) | | | | | | | | | | | | | | | |
| LOOP CTRL | | | | INDEX COUNT | | | | BASE UPDATE COUNT | | | | | | | | BASE UPDATE (STRIDE) | | | | | | | | | | | | | | | |
| IU7 | | | | IU6 | | | | IU5 | | | | IU4 | | | | IU3 | | | | IU2 | | | | IU1 | | | | IU0 | | | |

| | |
|---|---|
| LOOP CTRL | LOOP CTRL SPECIFIES A PARTICULAR ORDER IN WHICH PE, BASE AND INDEX VALUES ARE UPDATED. THREE POSSIBLE ORDERS ARE SELECTABLE WHICH CORRESPOND TO THREE ASSIGNMENTS OF PE, BASE AND INDEX UPDATE TO THREE NESTED CONTROL LOOPS (OUTER, MIDDLE AND INNER).<br>00 - BASE (OUTER), INDEX (MIDDLE), PE (INNER) - BIP<br>01 - BASE (OUTER), PE (MIDDLE), INDEX (INNER) - BPI<br>10 - PE (OUTER), BASE (MIDDLE), INDEX (INNER) - PBI |
| PE COUNT | SPECIFIES THE NUMBER OF PEs TO BE ACCESSED FOR EACH TIME THE PE COUNTER IS SIGNALED TO RELOAD. VALID VALUES ARE:<br>0000 - MAX NUMBER OF PEs AS SPECIFIED IN THE PE CONFIGURATION REGISTER<br>0001 - 1<br>0010 - 2<br>0011 - 3 ETC., ETC. |
| BASE UPDATE (STRIDE) | DISTANCE BETWEEN SUCCESSIVE BLOCKS. UNITS ARE OF "DATA TYPE" SIZE. |
| BASE UPDATE COUNT | USED FOR PBI LOOP CONTROL. SPECIFIES THE NUMBER OF TIMES THE BASE IS UPDATED BEFORE EXITING TO THE OUTER LOOP (PE UPDATE). RANGE IS 1 TO 256. |
| | |
| IUx | IU0 - IU7 FORM AN INDEX UPDATE TABLE WITH EACH ENTRY BEING A 4-BIT UPDATE VALUE. UPDATE VALUES ARE INTEGERS IN THE RANGE OF -8 TO +7 |
| INDEX COUNT | NUMBER OF TIMES TO EXECUTE THE INDEX UPDATE LOOP. THIS VARIABLE PROVIDES THE LOOP EXIT CONTROL FOR THE INDEX LOOP. |

FIG. 18

1800

| LOOP CONTROL: BIP (INDEX VARIES FIRST, THEN BASE, THEN PE ID) | | | | |
|---|---|---|---|---|
| ADDRESS | PE0 | PE1 | PE2 | PE3 |
| 0x0000 | 0 | 1 | 2 | 3 |
| 0x0001 | 24 | 25 | 26 | 27 |
| 0x0002 | 4 | 5 | 6 | 7 |
| 0x0003 | 20 | 21 | 22 | 23 |
| 0x0004 | 8 | 9 | 10 | 11 |
| 0x0005 | 16 | 17 | 18 | 19 |
| 0x0006 | 12 | 13 | 14 | 15 |
| 0x0007 | | | | |
| 0x0008 | 28 | 29 | 30 | 31 |
| 0x0009 | | | | |
| 0x000a | 32 | 33 | 34 | 35 |

PATTERN ABOVE RESULTS FROM AFTER A TRANSFER WITH THE FOLLOWING ASSUMPTIONS:

- TSI.block INSTRUCTION READS SUCCESSIVE ADDRESSES FROM SYSTEM MEMORY, DATA ELEMENT VALUES ARE 0,1,2,...etc.
- TCI.select INDEX INSTRUCTION PLACES VALUES IN PE MEMORIES USING THE FOLLOWING PARAMETERS
- ASSUME NO PE VID-to-PID TRANSLATION
- TRANSFER COUNT = 36
- PE ADDRESS = 0
- PE COUNT = 4
- LOOP CONTROL = BIP
- BASE UPDATE COUNT = 0
- BASE UPDATE = 8
- INDEX UPDATE TABLE VALUE IS 0x00EEF222 WHICH GIVES UPDATES 2,2,2,-1,-2,-2
- INDEX COUNT = 7

FIG. 19

1900

| 31 30 29 28 27 | 26 | 25 24 | 23 22 21 20 | 19 | 18 17 16 | 15 14 13 12 11 10 09 08 07 06 05 04 03 02 01 00 |
|---|---|---|---|---|---|---|
| CTU TRANSFER | I/O | TYPE | SELECT-PE | X | RSVD | CORE TRANSFER COUNT (CTC) |
| RESERVED | | | | | | STARTING TRANSFER ADDRESS (WITHIN PE MEMORY) |
| LOOP CTRL | PE COUNT | BASE UPDATE COUNT | | | | BASE UPDATE (STRIDE) |
| INDEX COUNT (HOLD) RANGE: 1 TO 65536 | | | | | | RESERVED / INDEX UPDATE RANGE: 1-256 |
| PEMSK7 | PEMSK6 | PEMSK5 | PEMSK4 | PEMSK3 | PEMSK2 | PEMSK1 / PEMSK0 |

| | |
|---|---|
| LOOP CTRL | LOOP CTRL SPECIFIES A PARTICULAR ORDER IN WHICH PE, BASE AND INDEX VALUES ARE UPDATED. THREE POSSIBLE ORDERS ARE SELECTABLE WHICH CORRESPOND TO THREE ASSIGNMENTS OF PE, BASE AND INDEX UPDATE TO THREE NESTED CONTROL LOOPS (OUTER, MIDDLE AND INNER).<br>00 - BASE (OUTER), INDEX (MIDDLE), PE (INNER) - BIP<br>01 - BASE (OUTER), PE (MIDDLE), INDEX (INNER) - BPI<br>10 - PE (OUTER), BASE (MIDDLE), INDEX (INNER) - PBI |
| PE COUNT | (NOT USED FOR THIS ADDRESS MODE) |
| BASE UPDATE (STRIDE) | DISTANCE BETWEEN SUCCESSIVE BLOCKS. UNITS ARE OF "DATA TYPE" SIZE. |
| BASE UPDATE COUNT | USED FOR PBI LOOP CONTROL. SPECIFIES THE NUMBER OF TIMES THE BASE IS UPDATED BEFORE EXITING TO THE OUTER LOOP (PE UPDATE). RANGE IS 1 TO 256. |
| INDEX COUNT (HOLD) | NUMBER OF CONTIGUOUS DATA ITEMS IN A BLOCK |
| INDEX UPDATE | DISTANCE BETWEEN SUCCESSIVE ITEMS WITHIN A BLOCK. UNITS ARE OF "DATA TYPE" SIZE. |
| PEVEC | THESE VALUES FORM A TABLE OF 4-BIT FIELDS THAT ARE USED TO SPECIFY PE SELECTIONS FOR UP TO 8 PASSES THROUGH THE PEs. FOR EACH FOUR BIT FIELD, A '1' BIT SELECTS THE PE VIO CORRESPONDING TO ITS BIT POSITION. PEMSK0 MUST HAVE AT LEAST ONE '1' BIT, AND THE FIRST ALL-ZERO FIELD DETECTED CAUSES SELECTION TO BEGIN AGAIN WITH THE PEMSK0 FIELD.<br>IN BIP AND BPI LOOP MODES, WHEN THE BASE IS UPDATED, THE PEVEC TABLE RESETS TO THE FIRST 4-BIT ENTRY REGARDLESS OF WHICH ENTRY WAS LAST IN USE.<br>IN PBI LOOP MODE THE PEVEC ENTRIES ARE CYCLED THROUGH CONTINUOUSLY. |

FIG. 20

2000

| LOOP CONTROL: BIP (INDEX VARIES FIRST, THEN BASE, THEN PE ID) | | | | |
|---|---|---|---|---|
| ADDRESS (WORDS) | PE0 | PE1 | PE2 | PE3 |
| 0x0000 | | 0 | 1 | 2 |
| 0x0001 | | 3 | 4 | 5 |
| 0x0002 | 9 | 6 | 7 | 8 |
| 0x0003 | | 10 | 11 | 12 |
| 0x0004 | | | | |
| 0x0005 | | | | |
| 0x0006 | | | | |
| 0x0007 | | | | |
| 0x0008 | | 13 | 14 | 15 |
| 0x0009 | | 16 | 17 | 18 |
| 0x000a | 22 | 19 | 20 | 21 |
| 0x000a | | 23 | 24 | 25 |

PATTERN ABOVE RESULTS FROM AFTER A TRANSFER WITH THE FOLLOWING ASSUMPTIONS:

- TSI.block INSTRUCTION READS SUCCESSIVE ADDRESSES FROM SYSTEM MEMORY, DATA ELEMENT VALUES ARE 0,1,2,...etc.
- ASSUME PE TRANSLATE TABLE MAPS 0→1, 1→2, 2→3, 3→0
- TCI.selectpe INSTRUCTION PLACES VALUES IN PE MEMORIES USING THE FOLLOWING PARAMETERS
- TRANSFER COUNT = 26
- INITIAL PE ADDRESS OFFSET = 0
- PE COUNT = NOT USED
- LOOP CONTROL = BIP
- BASE UPDATE COUNT = 0
- BASE UPDATE = 8
- INDEX UPDATE = 1
- INDEX COUNT = 4
- PE TABLE IS 0x00000F77
  - FIRST PASS SELECT VIDs: 0, 1, 2 (TRANSLATION CONVERTS THESE TO PIDs: 1,2,3)
  - NEXT PASS SELECT VIDs 0,1,2 (TRANSLATION CONVERTS THESE TO PIDs: 1,2,3)
  - NEXT PASS SELECT VIDs 0,1,2,3 (TRANSLATION CONVERTS THESE TO PIDs: 1,2,3,0)

FIG. 21

2100

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|
| CTU TRANSFER | | | | | I/O | TYPE | | SELECT-INDEX-PE | | | | X | ASVD | | | CORE TRANSFER COUNT (CTC) | | | | | | | | | | | | | | | |
| IU COUNT | | | | RESERVED | | | | | | | | | | | | STARTING TRANSFER ADDRESS (WITHIN PE MEMORY) | | | | | | | | | | | | | | | |
| LOOP CTRL | | | | PE COUNT | | | | BASE UPDATE COUNT | | | | | | | | BASE UPDATE (STRIDE) | | | | | | | | | | | | | | | |
| IU7 | | | | IU6 | | | | IU5 | | | | IU4 | | | | IU3 | | | | IU2 | | | | IU1 | | | | IU0 | | | |
| PEMSK7 | | | | PEMSK6 | | | | PEMSK5 | | | | PEMSK4 | | | | PEMSK3 | | | | PEMSK2 | | | | PEMSK1 | | | | PEMSK0 | | | |

| | |
|---|---|
| LOOP CTRL | LOOP CTRL SPECIFIES A PARTICULAR ORDER IN WHICH PE, BASE AND INDEX VALUES ARE UPDATED. THREE POSSIBLE ORDERS ARE SELECTABLE WHICH CORRESPOND TO THREE ASSIGNMENTS OF PE, BASE AND INDEX UPDATE TO THREE NESTED CONTROL LOOPS (OUTER, MIDDLE AND INNER).<br>00 - BASE (OUTER), INDEX (MIDDLE), PE (INNER) - BIP<br>01 - BASE (OUTER), PE (MIDDLE), INDEX (INNER) - BPI<br>10 - PE (OUTER), BASE (MIDDLE), INDEX (INNER) - PBI |
| PE COUNT | (NOT USED FOR THIS ADDRESS MODE) |
| BASE UPDATE (STRIDE) | DISTANCE BETWEEN SUCCESSIVE BLOCKS. UNITS ARE OF "DATA TYPE" SIZE. |
| BASE UPDATE COUNT | USED FOR PBI LOOP CONTROL. SPECIFIES THE NUMBER OF TIMES THE BASE IS UPDATED BEFORE EXITING TO THE OUTER LOOP (PE UPDATE). RANGE IS 1 TO 256. |
| IU COUNT | INDEX UPDATE COUNT. THIS IS THE NUMBER OF ENTRIES IN THE INDEX UPDATE TABLE. WHEN 'IU Count' INDEX UPDATES HAVE OCCURRED (WITH ASSOCIATED ACCESSES AFTER UPDATE), THE NEXT OUTER LOOP VARIABLE (B OR P) IS UPDATED. SUBSEQUENT INDEX UPDATES START AT THE FIRST ENTRY AGAIN (IU0). IF 'IU Count' IS GREATER THAN 8, THE TABLE ENTRIES ARE USED AGAIN, STARTING AT THE BEGINNING OF THE TABLE. |
| IUx | IU0 - IU7 FORM AN INDEX UPDATE TABLE WITH EACH ENTRY BEING A 4-BIT UPDATE VALUE. UPDATE VALUES ARE INTEGERS IN THE RANGE OF -8 TO +7. |
| PEMSKx | THESE VALUES FORM A TABLE OF 4-BIT FIELDS THAT ARE USED TO SPECIFY PE SELECTIONS FOR UP TO 8 PASSES THROUGH THE PEs. FOR EACH FOUR BIT FIELD, A '1' BIT SELECTS THE PE CORRESPONDING TO ITS BIT POSITION. PEMSK0 MUST HAVE AT LEAST ONE '1' BIT, AND THE FIRST ALL-ZERO FIELD DETECTED CAUSES SELECTION TO BEGIN AGAIN WITH THE PEMSK0 FIELD. |

FIG. 22

2200

LOOP CONTROL: BIP (INDEX VARIES FIRST, THEN BASE, THEN PE ID)

| ADDRESS (WORDS) | PE0 | PE1 | PE2 | PE3 |
|---|---|---|---|---|
| 0x0000 | | 0 | 1 | 2 |
| 0x0001 | | | | |
| 0x0002 | | 3 | 4 | 5 |
| 0x0003 | | | | |
| 0x0004 | | | | |
| 0x0005 | 9 | 6 | 7 | 8 |
| 0x0006 | | 10 | 11 | 12 |
| 0x0007 | | | | |
| 0x0008 | | 13 | 14 | 15 |
| 0x0009 | | | | |
| 0x000a | | | | |
| 0x000a | 19 | 16 | 17 | 18 |

PATTERN ABOVE RESULTS FROM AFTER A TRANSFER WITH THE FOLLOWING ASSUMPTIONS:

- TSI.block INSTRUCTION READS SUCCESSIVE ADDRESSES FROM SYSTEM MEMORY. DATA ELEMENT VALUES ARE 0,1,2,...etc.
- ASSUME PE TRANSLATE TABLE MAPS 0→1, 1→2, 2→3, 3→0
- TCI.selectpe INSTRUCTION PLACES VALUES IN PE MEMORIES USING THE FOLLOWING PARAMETERS
- TRANSFER COUNT = 20
- INITIAL PE ADDRESS OFFSET = 0
- PE COUNT = NOT USED
- LOOP CONTROL = BIP
- BASE UPDATE COUNT = 0
- BASE UPDATE = 6
- INDEX COUNT = 3
- INDEX TABLE = 0x00000032 (+2, THEN +3)
- PE HELPE IS 0x0000DF77
  - FIRST PASS SELECT VIDs 0,1,2 (TRANSLATION CONVERTS THESE TO PIDs: 1,2,3)
  - NEXT PASS SELECT VIDs 0,1,2 (TRANSLATION CONVERTS THESE TO PIDs: 1,2,3)
  - NEXT PASS SELECT VIDs 0,1,2,3 (TRANSLATION CONVERTS THESE TO PIDs: 1,2,3,0)

METHODS AND APPARATUS FOR PROVIDING DIRECT MEMORY ACCESS CONTROL

Matter enclosed in heavy brackets [ ] appears in the original patent but forms no part of this reissue specification; matter printed in italics indicates the additions made by reissue.

RELATED APPLICATIONS

*More than one reissue application has been filed for the reissue of U.S. Pat. No. 6,453,367. The reissue applications are application Ser. No. 10/819,885 and which is the present divisional reissue application.*

The present application is a division of U.S. application Ser. No. 09/472,372 filed Dec. 23, 1999, now U.S. Pat. No. 6,256,683, which in turn claimed the benefit of U.S. Provisional Application Ser. No. 60/113,637 entitled "Methods and Apparatus for Providing Direct Memory Access (DMA) Engine" and filed Dec. 23, 1998 which is incorporated by reference in its entirety herein.

FIELD OF THE INVENTION

The present invention relates generally to improvements in array processing, and more particularly to advantageous techniques for providing improved mechanisms of data distribution to, and collection from multiple memories often associated with and local to processing elements within an array processor.

BACKGROUND OF THE INVENTION

Various prior art techniques exist for the transfer of data between system memories or between system memories and I/O devices. FIG. 1 shows a conventional data processing system 100 comprising a host uniprocessor 110, processor local memory 120, direct memory access (DMA) controller 160, system memory 150 which is usually a larger memory store than the processor local memory, having longer access latency, and input/output (I/O) devices 130 and 140.

The DMA controller 160 provides a mechanism for transferring data between processor local memory and system memory or I/O devices concurrent with uniprocessor execution. DMA controllers are sometimes referred to as I/O processors or transfer processors in the literature. System performance is improved since the host uniprocessor can perform computations while the DMA controller is transferring new input data to the processor local memory and transferring result data to output devices or the system memory. A data transfer is typically specified with the following minimum set of parameters: source address, destination address, and number of data elements to transfer. Addresses are interpreted by the system hardware and uniquely specify I/O devices or memory locations from which data must be read or to which data must be written. Sometimes additional parameters are provided such as element size. One of the limitations of conventional DMA controllers is that address generation capabilities for the data source and data destination are often constrained to be the same. For example, when only a source address, destination address and a transfer count are specified, the implied data access pattern is block-oriented, that is, a sequence of data words from contiguous addresses starting with the source address is copied to a sequence of contiguous addresses starting at the destination address. Array processing presents challenges for data collection and distribution both in terms of addressing flexibility, control and performance. The patterns in which data elements are distributed and collected from processing element local memories can significantly affect the overall performance of the processing system. With the advent of the ManArray architecture it has been recognized that it will be advantageous to have improved techniques for data transfer which provide these capabilities and which are tailored to this new architecture.

SUMMARY OF THE INVENTION

As described in detail below, the present invention addresses a variety of advantageous methods and apparatus for improved data transfer control within a data processing system. In particular we provide improved techniques for: distributing data to, and collecting data from an array of processing elements (PEs) in a flexible and efficient manner; and PE address translation which allows data distribution and collection based on PE virtual IDs.

Further aspects of the present invention are related to a virtual-to-physical PE ID translation which works together with a ManArray PE interconnection topology to support a variety of communication models (such as hypercube and mesh) through data placement based upon a PE virtual ID. This result can be accomplished in a DMA controller by translation, through a VID-to-PID lookup table or through combinational logic, where the resulting PID becomes an addressing component on the DMA bus to PE local memories. This result can also be achieved at the PE local memories within the interface logic, where a VID available to the interface logic is compared to a VID presented on the DMA bus. A match at a particular memory interface allows that memory to accept the access. The present invention also addresses the provision of PE addressing modes based on generating data access patterns from logically nested parameterized loops. Varying assignments of loop parameters to nesting level allows flexible data access patterns to be generated. Providing varying mechanisms for updating loop parameters provides greater flexibility for generating complex-periodic access [patters] *patterns*, such as select-index modes which provide a table of index-update values which are used when the index loop parameter is updated; select-PE modes which provide a table of bit-vector control values, each of which specifies the PEs to be accessed for an iteration through the "PE update loop" (i.e., the loop which PE update is assigned); and select-index-PE modes which provide both select-index and select-PE update capability and combine to form the most flexible mode for generating complex-periodic data access patterns. Further, the invention addresses the design of a looping mechanism to be reentrant thereby allowing any addressing mode to be restarted after completing a specific number of element transfers, by just loading or reloading a new transfer count and continuing the transfer. This result is accomplished by initializing addressing parameters at instruction load time, and only updating them after a loop exits.

These and other advantages of the present invention will be apparent from the drawings and the Detailed Description which follow.

BRIEF DESCRIPTION OF DRAWINGS

FIG. 8 shows an exemplary PEXLAT instruction ("load VID-to-PID table");

FIG. 9 illustrates a VID-to-PID translation table register, called the PETABLE register in a presently preferred embodiment;

FIG. 13 illustrates an exemplary format for a PE Blockcyclic instruction in accordance with the present invention;

FIG. 14 shows an exemplary transfer result using PE Blockcyclic address mode with BIP loop assignment;

FIG. 15 shows an exemplary transfer result using PE Blockcyclic address mode with BPI loop assignment;

FIG. 16 shows an exemplary transfer result using PE Blockcyclic address mode with PBI loop assignment;

FIG. 17 illustrates an exemplary format for a PE Select-Index transfer instruction in accordance with the present invention;

FIG. 18 shows an exemplary transfer result using a PE Select-Index address mode with BIP loop assignment;

FIG. 19 illustrates an exemplary format for a PE Select-PE transfer instruction in accordance with the present invention;

FIG. 20 shows an exemplary transfer result using a PE Select-PE address mode with BIP loop assignment;

FIG. 21 illustrates an exemplary format for a PE Select-Index-PE transfer instruction in accordance with the present invention; and FIG. 22 shows an exemplary transfer result using a PE Select-Index -PE address mode with BIP loop assignment.

DETAILED DESCRIPTION

Figure 1:
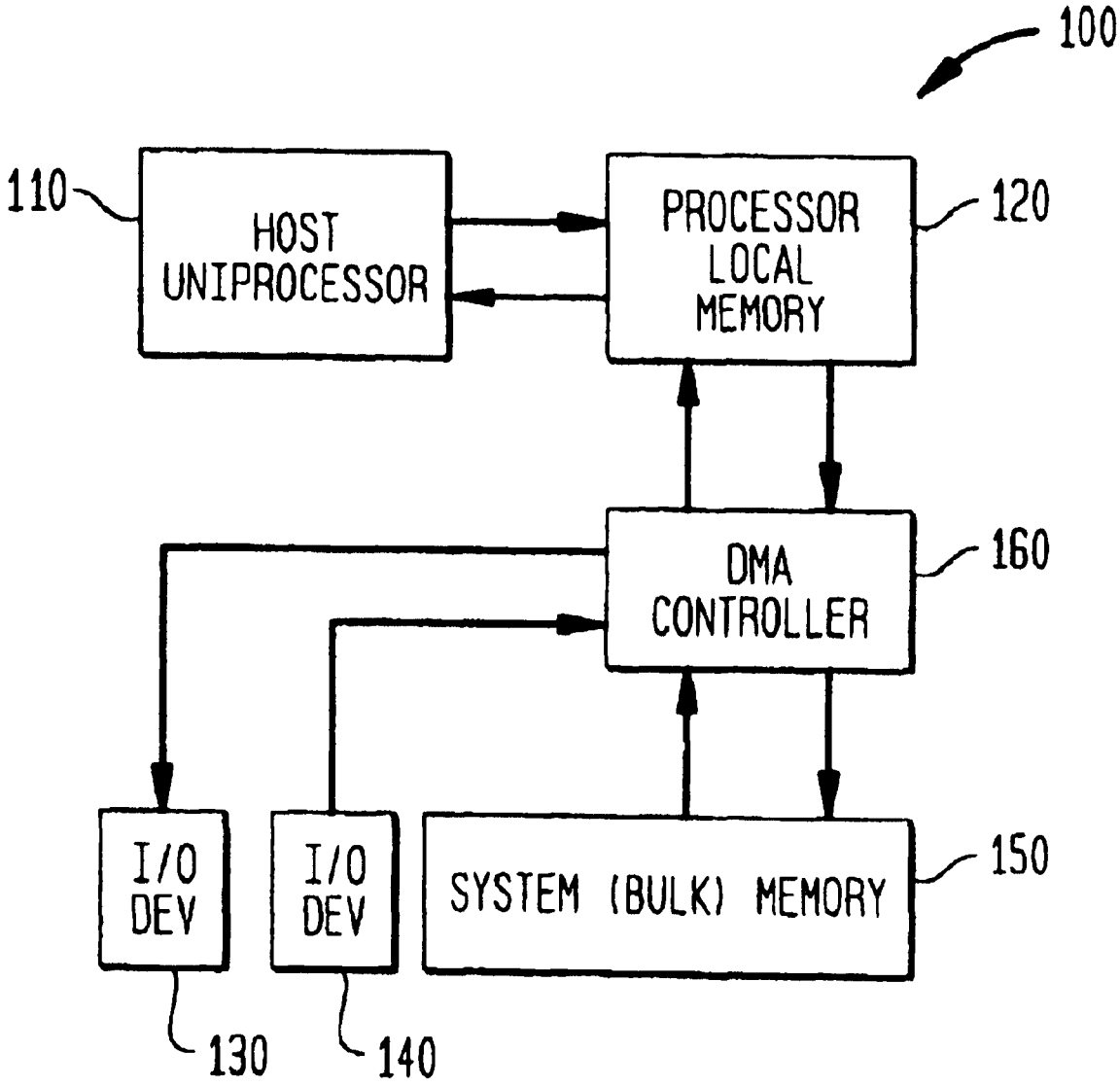
FIG. 1 shows a conventional data processing system with a DMA controller to support data transfers concurrent with host processor computation.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, U.S. patent application Ser. No. 09/169,256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999, now U.S. Pat. No. 6,216,223, U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999, U.S. patent application Ser. No. 09/432,705 filed Nov. 2, 1999, U.S. patent application Ser. No. 09/471,217 filed Dec. 23, 1999, now U.S. Pat. No. 6,260,082, as well as, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for Loading of Very Long Instruction Word Memory" filed Dec. 23, 1999, respectively, all of which are assigned to the assignee of the present invention and incorporated by reference herein in their entirety.

The following definitions of terms are provided as background for the discussion of the invention which follows:

A "transfer" refers to the movement of one or more units of data from a source device (either I/O or memory) to a destination device (I/O or memory).

A data "source" or "destination" refers to a device from which data may be read or to which data may be written which is characterized by a contiguous sequence of one or more addresses, each of which is associated with a data storage element of some unit size. For some data sources and destinations there is a many-to-one mapping of addresses to data element storage locations. For example, an I/O device may be accessed using one of many addresses in a range of addresses, yet it will perform the same operation, such as returning the next data element of a FIFO, for any of them.

A "data access pattern" is a sequence of data source or destination addresses whose relationship to each other is periodic. For example, the sequence of addresses 0, 1, 2, 4, 5, 6, 8, 9, 10, . . . etc. is a data access pattern. If we look at the differences between successive addresses, we find: 1,1,2, 1,1,2, 1,1,2, . . . etc. Every three elements the pattern repeats.

An "address mode" or "addressing mode" refers to a rule that describes a sequence of addresses, usually in terms of one or more parameters. For example, a "block" address mode is described by the rule: address[i]=base_address+i where i=0, 1, 2, . . . etc. and where base_address is a parameter and refers to the starting address of the sequence.

Another example is a "stride" address mode which may be described by the rule:

$$address[i]=base_address+(i \bmod (stride-hold))+(i/hold)*stride$$

for i=0, 1, 2, . . . etc., and where base_address, stride and hold are parameters, and where division is integer division in which any remainder is discarded.

An "address generation unit (AGU)" is a hardware module that generates a sequence of addresses (a data access pattern) according to a programmed address mode.

"EOT" means "end-of-transfer" and refers to the state when a transfer execution unit (described in the following text) has completed its most recent transfer instruction by transferring the number of elements specified by the instruction's transfer count field.

The term "host processor" as used in the following description is any processor or device which can write control commands and read status from the DMA controller and/or which can respond to DMA controller messages and signals. In general, a host processor interacts with a DMA controller to control and synchronize the flow of data between devices and memories in the system in such a way as to avoid overrun and underrun conditions at the sources and destinations of data transfers.

The present invention provides a set of flexible addressing modes for supporting efficient data transfers to and from multiple memories, together with methods and apparatus for allowing data accesses to be directed to PEs according to virtual as opposed to physical IDs. This section describes an exemplary DMA controller and a system environment in which the present inventions may be effectively used. The following sections describe PE memory addressing, virtual-to-physical PE ID translation and its purpose, and a set of PE memory addressing modes or "PE addressing modes" which support numerous parallel algorithms with highly efficient data transfer.

Figure 2:
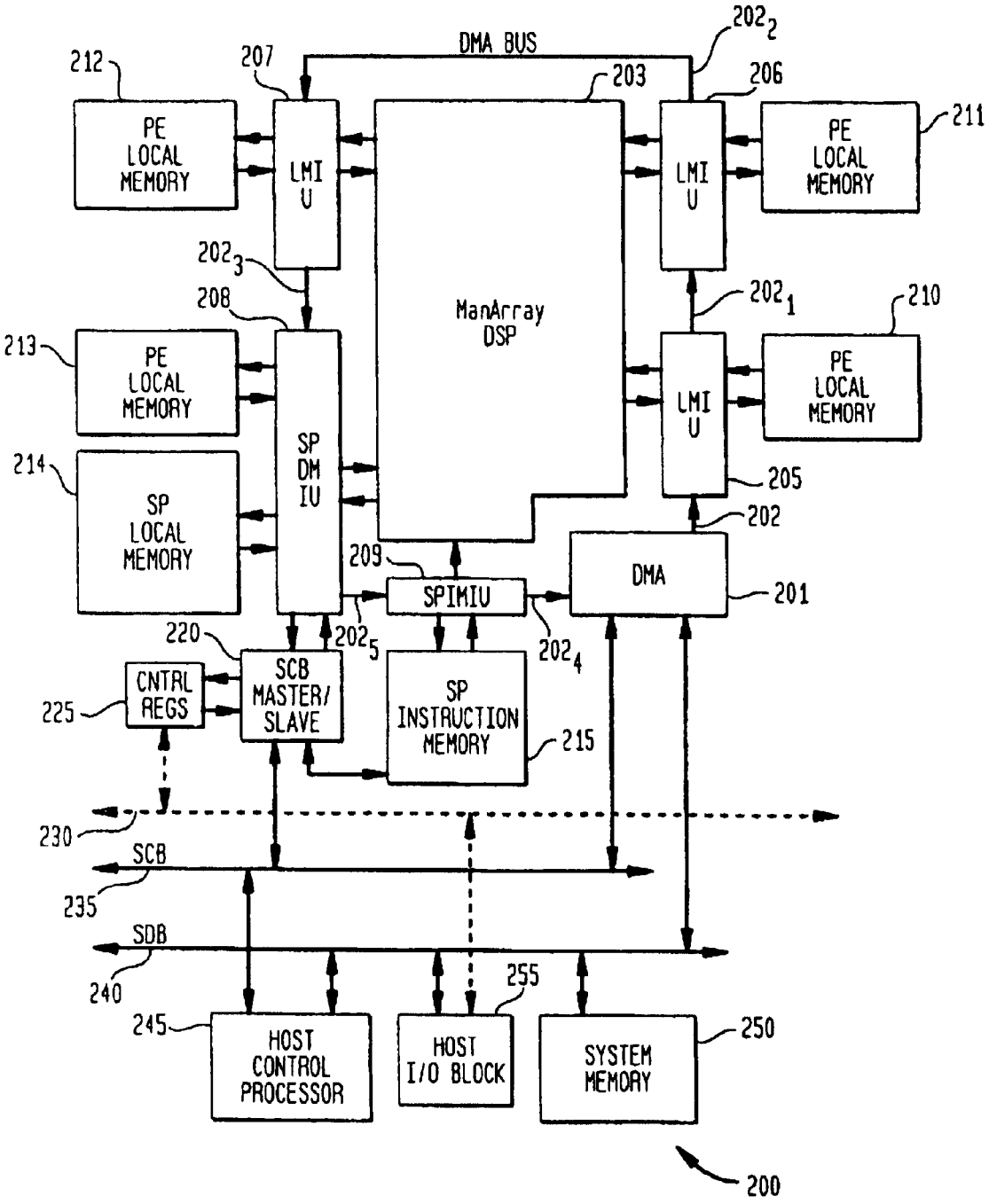
FIG. 2 illustrates a ManArray DSP with a DMA controller in a representative system in accordance with the present invention.

FIG. 2 shows an exemplary system 200 illustrating the context in which a ManArray DMA controller 201, in accordance with the present invention, resides. The DMA controller 201 accesses processor local memories 210, 211, 212, 213, 214 and 215 via a DMA Bus 202, $\mathbf{202}_1$, $\mathbf{202}_2$, $\mathbf{202}_3$, $\mathbf{202}_4$, $\mathbf{202}_5$ and memory interface units 205, 206, 207, 208 and 209 to which it is connected. A ManArray DSP 203 also connects to its local memories 210–215 via memory interface units 205–209. Further details of a presently preferred DSP 203 are found in the above incorporated by reference applications.

In this representative system, the DMA controller also connects to two system busses, a system control bus (SCB) 235 and a system data bus (SDB) 240. The DMA controller is designed to transfer data between devices on the SDB 240, such as a system memory 250 and the DSP 203 local memories 210–215. The SCB 235 is used by an SCB master such as the DSP 203 or a host control processor (HCP) 245 to program the DMA controller 201 with read and write addresses and registers to initiate control operations and read status. The SCB 235 is also used by the DMA controller 201 to send synchronization messages to other SCB bus slaves such as the DSP control registers 225 and a host I/O block 255. Some registers in these slaves can be polled by the DSP and HCP to receive status from the DMA. Alternatively, DMA writes to some of these slave addresses can be programmed to cause interrupts to the DSP and/or HCP allowing DMA controller messages to be handled by interrupt service routines.

Figure 3:
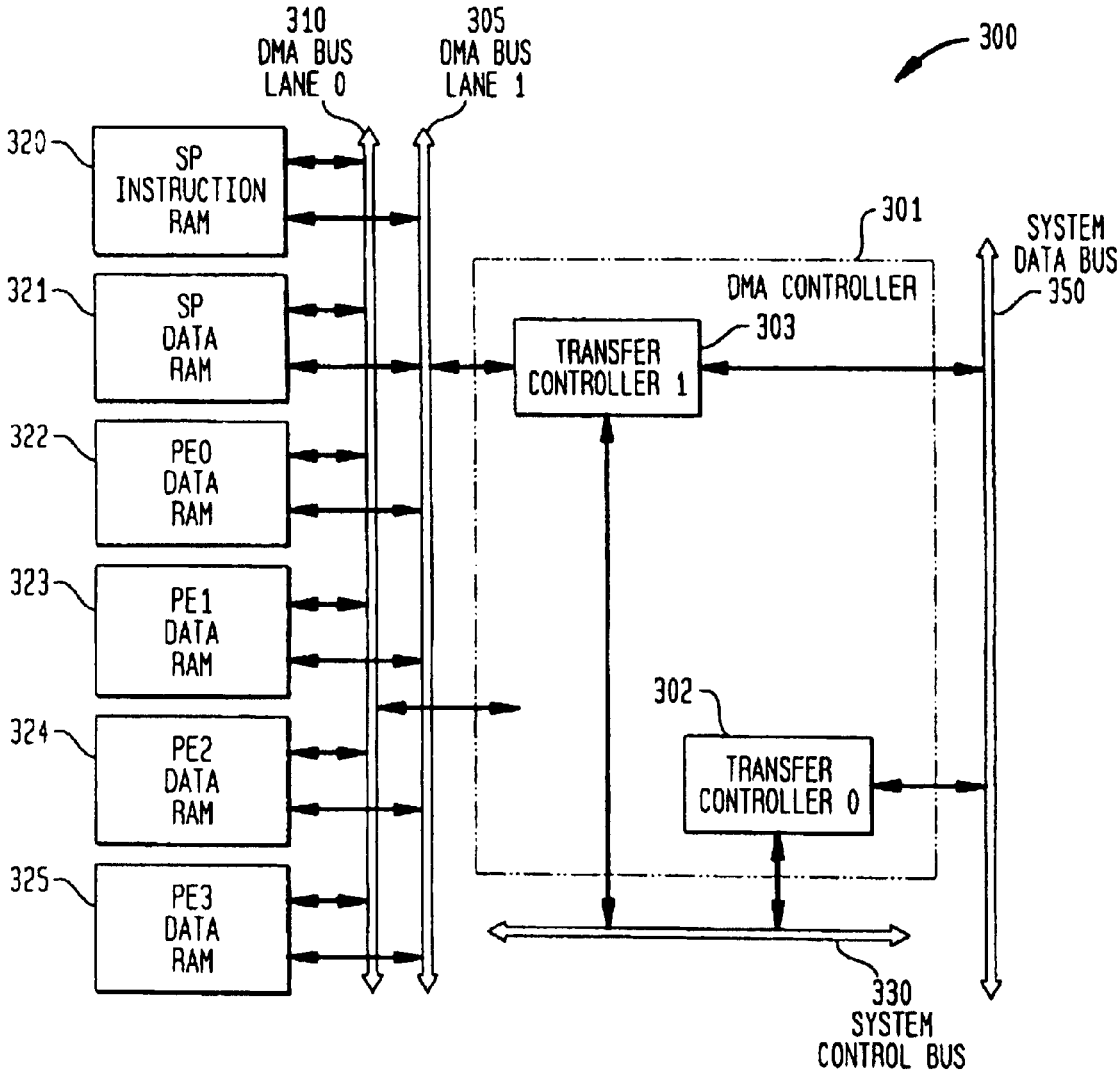
FIG. 3 illustrates a DMA controller implemented as a multiprocessor, with two transfer controllers, bus connections to a system memory, PE memories and a control bus.

FIG. 3 shows a system 300 which illustrates operation of a DMA Controller 301 which may suitably be a multiprocessor specialized to carry out data transfers utilizing one or more transfer controllers 302 and 303. Each transfer controller can operate as an independent processor or work together with other transfer controllers to carry out data transfers. The DMA busses 305 and 310 provide, in the presently preferred embodiment, independent data paths to local memories 320, 321, 322, 323, 324, 325, one for each transfer controller 302 and 303. In addition, each transfer controller is connected to SDB 350 and to SCB 330. Each transfer controller operates as a bus master and a bus slave on both the SCB and SDB. As a bus slave on the SCB, a transfer controller may be accessed by other SCB bus masters in order to read its internal state or to issue control commands. As a bus master on the SCB, a transfer controller can send synchronization messages to other SCB bus slaves. As a bus master on the SDB, a transfer controller performs data reads and writes from or to system memory or I/O devices which are bus slaves on the SDB. As a bus slave on the SDB, a transfer controller can cooperate with another SDB bus master in a "slave mode" allowing the bus master to read or write data directly from or to its data FIFOs (as discussed further below). It may be noted that the DMA busses 305 and 310, the SDB 350 and the SCB 330 may be implemented in different ways. For example, they may be implemented with varying bus widths, protocols, or the like consistent with the teachings of the present invention.

Figure 4:
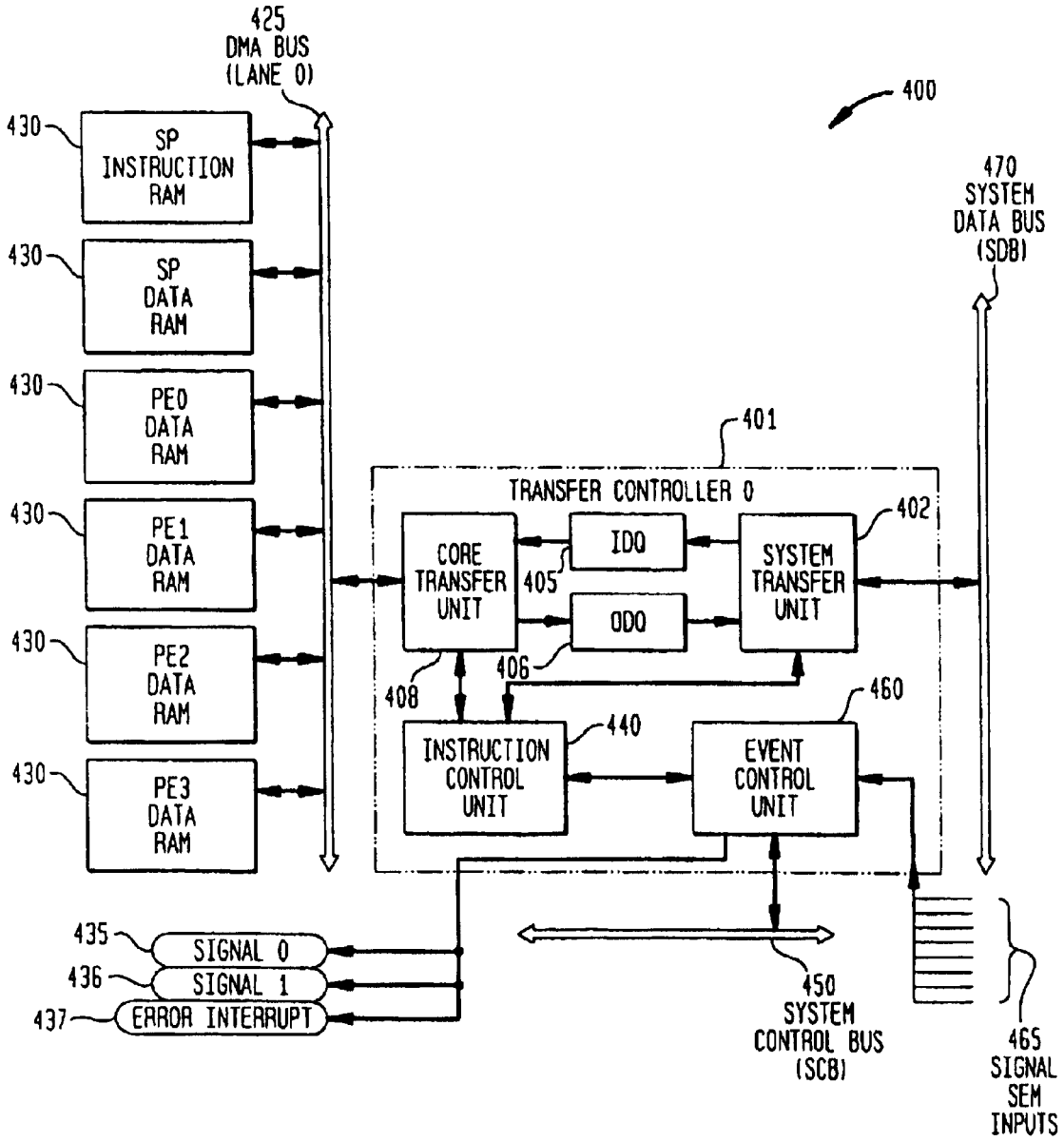
FIG. 4 shows a single transfer controller comprising 4 primary execution units, bus connections and FIFO buffers.

FIG. 4 shows a system 400 having single transfer controller 401 comprising a set of execution units including an instruction control unit (ICU) 440, a system transfer unit (STU) 402, a core transfer unit (CTU) 408 and an event control unit (ECU) 460. An inbound data queue (IDQ) 405 is a data FIFO buffer which is written with data from an SDB 470 under control of the STU 402. Data is read from the IDQ 405 under control of the CTU 408 to be sent to core memories 430, or sent to the ICU 440 in the case of instruction fetches. An outbound data queue (ODQ) 406 is a data FIFO which is written with data from DMA busses 425 under control of the CTU 408, to be sent to an SDB 470 device or memory under the control of the STU 402. The CTU 408 may also read DMA instructions from a memory attached to the DMA bus, which are forwarded to the ICU 440 for initial decoding. The ECU 460 receives signal inputs from external devices 465, commands from the SCB 450 and instruction data from the ICU 440. It generates output signals 435, 436 and 437 which may be used to generate interrupts on host control processors within the system, and can act as a bus master on the SCB 450 to send synchronization messages to SCB bus slaves.

Each transfer controller within a ManArray DMA controller is designed to fetch its own stream of DMA instructions. DMA instructions are of five basic types: transfer; branch; load; synchronization; and state control. The branch, load, synchronization, and state control types of instructions are collectively referred to as "control instructions", and distinguished from the transfer instructions which actually perform data transfers. DMA instructions are typically of multi-word length and require a variable number of cycles to execute although several control instructions require only a single word to specify. Although the presently preferred embodiment supports multiple DMA instruction types as described in further detail in U.S. patent application Ser. No. 09/471,217 filed Dec. 23, 1999, now U.S. Pat. No. 6,260,082, and incorporated by reference in its entirety herein, the present invention focuses on instructions and mechanisms which provide for flexible and efficient data transfers to and from multiple memories.

Referring further to system 400 of FIG. 4, transfer-type instructions are dispatched by the ICU for further decoding and execution by the STU 402 and the CTU 408. Transfer instructions have the property that they are fetched and decoded sequentially, in order to load transfer parameters into the appropriate execution unit, but are executed concurrently. The control means for initiating execution of transfer instructions is a flag bit contained in the instruction itself, and is described below.

A "transfer-system-inbound" (TSI) instruction moves data from the SDB 470 to the IDQ 405 and is executed by the STU. A "transfer-core-inbound" (TCI) instruction moves data from the IDQ 405 to the DMA Bus 425 and is executed by the CTU. A "transfer-core-outbound" (TCO) instruction moves data from the DMA Bus 425 to the ODQ 406 and is executed by the CTU. A "transfer-system-outbound" (TSO) instruction moves data from the ODQ 406 to the SDB 470 and is executed by the STU. Two transfer instructions are required to move data between an SDB system memory and one or more SP or PE local memories on the DMA bus, and both instructions are executed concurrently: a TSI, TCI pair or a TSO, TCO pair.

The address parameter of STU transfer instructions TSI and TSO refers to addresses on the SDB while the address parameter of CTU transfer instructions refers to addresses on the DMA bus to PE and SP local memories.

Figure 5:
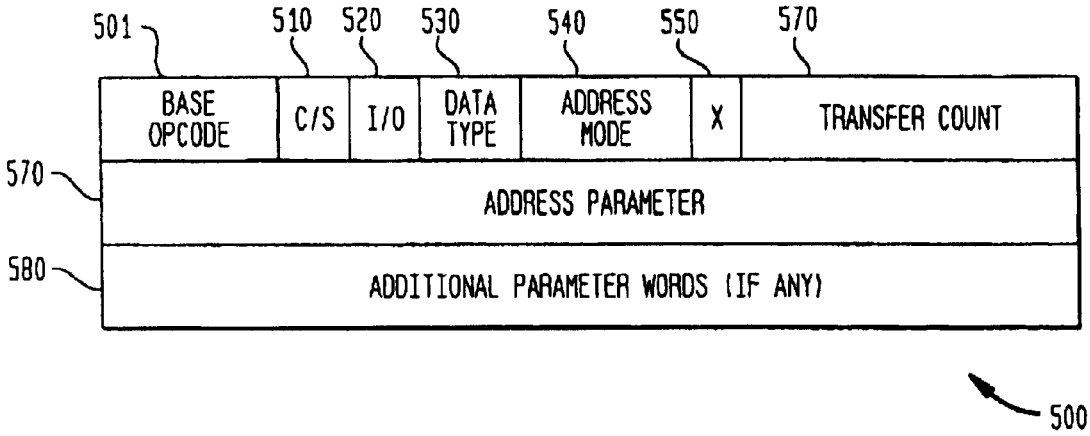
FIG. 5 shows an exemplary format of a transfer type instruction in accordance with the present invention.

FIG. 5 shows an exemplary instruction format 500 for transfer instructions. A base opcode field 501 indicates that the instruction is of transfer type. A C/S field 510 indicates the transfer unit (CTU or STU) and I/O field 520 indicates whether the transfer direction is inbound or outbound. The execute ("X") field 550 is a field which, when set to "1", indicates a "start transfer" event, that is, that the transfer should start immediately after loading the transfer instruction. When the "X" field is "0", then the parameters are loaded into the specified unit but the transfer is not initiated. Instruction fetch/decode continues normally until a "start transfer" event occurs. A data type field 530 indicates the size of each element transferred and an address mode 540 refers to the data access pattern which must be generated by the transfer unit. A transfer count 560 indicates the number of data elements of size "data type" which are to be transferred to or from the target memory/device before EOT occurs for that unit. An address parameter 570 specifies the starting address for the transfer. Other parameters 580 may follow the address word of the instruction, depending on the addressing mode used.

While there are six memories 210, 211, 212, 213, 214, and 215 shown in FIG. 2, the PE address modes access only the set of PE memories 210, 211, 212, and 213 in this exemplary ManArray DSP configuration. The address of a data element within PE local memory space is specified with three variables, a PE ID, a base value and an index value. The base and the index values are summed to form an offset into a PE memory relative to an address 0, the first address of that PE's memory. The address of a PE data element is therefore given by a pair: PE data address=(PE ID, Base+Index).

The ManArray architecture supports a unique interconnection network between processing elements (PEs) which uses PE virtual IDs (VIDs) to support useful single-cycle communication paths, for example, torus or hypercube paths. In some array organizations, the PE's physical and virtual IDs are equal. The VIDs are used in the architecture to specify the pattern for data distribution and collection. When data is distributed according to the pattern established by VID assignment, then efficient inter-PE communication required by the programmer becomes available. As an example, if a programmer needs to establish a hypercube connectivity for a 16 PE ManArray processor, the data will be distributed according to a VID assignment in such a manner that the physical switch connections allow data to be transferred between PEs as though the switch topology were a hypercube even if the switch connections between physical PEs do not support the fill hyper-cube interconnect. The present invention describes two approaches whereby the DMA controller can access PE memories according to their VIDs, effectively mapping PE virtual IDs to PE physical IDs (PIDs). The first uses VID-to-PID translation within the CTU of a transfer controller. This translation can be performed either through table-lookup, or through logic permutations on the VID. The second approach associates a VID with a PE by providing a programmable register within the PE or the PE local memory interface unit (LMIU), FIG. 2 205, 206, 207 and 208 which is used by the LMIU logic to "capture" a data access when its VID matches a VID provided on the DMA Bus for each DMA memory access.

VID to PID Translation within the DMA Controller

Figure 6:
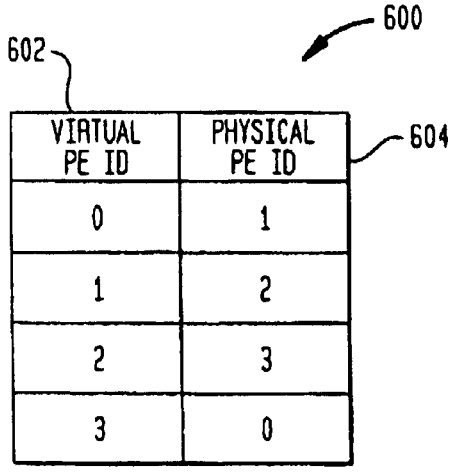
FIG. 6 shows an exemplary virtual PE identification to physical PE identification (VID-to-PID) translation.

With this approach, a PE VID-to-PID table is maintained in the DMA controller so that data may be distributed to the ManArray according to a programmer's view of the array. In the preferred embodiment, this table is maintained in the CTU of each transfer controller. FIG. 6 shows an exemplary mapping table 600 of VID into PID for a four PE system, such as a ManArray 2×2 system. The VIDs are in column 602 on the left and their corresponding PIDs are shown in column 604 on the right. An example of a table lookup implementation of the mapping of FIG. 6 is illustrated logically as system 700 of FIG. 7. In the presently preferred embodiment, a translation table 710 is stored in the CTU of a transfer controller. A CTU transfer instruction 705 (TCI or TCO) specifies a starting address 775 which is used by AGU 770 to generate an initial VID 720. The VID 720 controls the selection of one of the elements of the VID-to-PID lookup table 710 through multiplexer 715 which is then sent to a DMA Bus 740 as the PE ID component of the PE address. The numbers on the multiplexer 715 indicate the VID value which must be applied to select the corresponding input. Successive VIDs are generated by the AGU 770, possibly in a recursive fashion as shown by feedback 708. At the same time, the AGU 770 generates a sequence of PE memory offsets 730, also possibly using recursive feedback 755. The PE memory offset 750 is also sent to the DMA bus as a second component of a PE address. Logic in the local memory interface units (LMIUs) is used to compare the PE ID sent on the DMAbus to a stored PID (hard-coded) for any DMA bus access. If this matches, then the LMIU accepts the access and accepts write data or returns read data.

Figure 7:
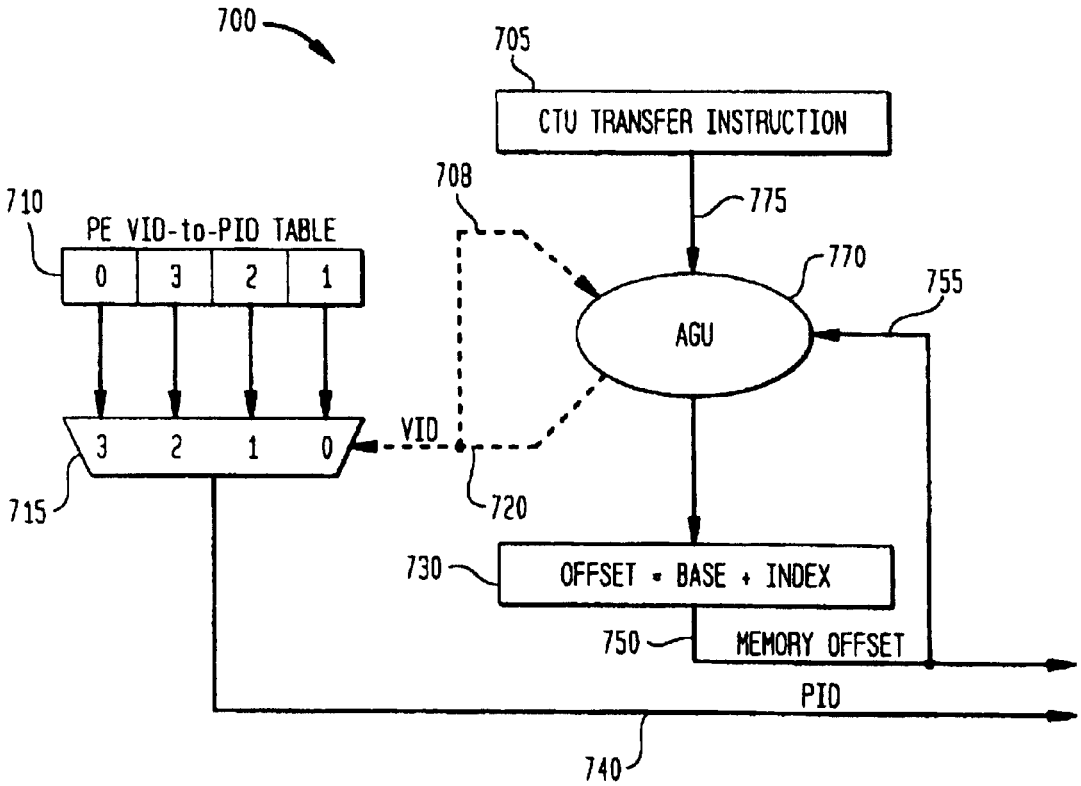
FIG. 7 shows an exemplary logical implementation of VID-to-PID translation.

The approach of FIG. 7 has the advantage that all mappings of PE VIDs to PIDs are supported. With larger numbers of PE local memories, the register or memory space required to store this table grows. For example, a 16 PE memory system requires 64 bits of register or memory space to store the PIDs. An alternative approach to table lookup-based translation is to provide logic which performs a subset of all VID-to-PID mappings. This translation logic would also be parameterized, but would require significantly fewer bits to configure. As a simple example, let the PID be formed by complementing any bit of the VID. If the PID and VID require 4 bits to represent the needed IDs, say for a 16 PE system, then a four bit "translation vector" (XVEC) must be stored to configure the translation rather than the 64 bits for table lookup. The PID is obtained from the VID by the following: PID=VID xor XVEC. That is, each bit of VID is exclusive-or'd with the corresponding bit of XVEC. The set of PIDs resulting from applying this operation to each VID constitutes the mapping. Obviously, the number of mappings available is far fewer than with a table lookup approach, but for systems with a large number of PE memories, only a few mappings may be required to support the desired communication patterns.

In the presently preferred embodiment, a lookup table is used to perform the VID-to-PID translation. Two approaches are provided for initializing the translation table. The first is through a DMA instruction 800, shown in FIG. 8. When executed, DMA instruction 800 loads a PETABLE register 900 which is illustrated in FIG. 9. The second approach is through a direct write of the PETABLE register 900 via the SCB.

PE Virtual IDs Stored in Local Memory Interface Units

The second approach to directing data access according to PE VID relies on distributing the PE VIDs to each PE local memory interface unit (LMIU). The VID for each PE might reside in a register either in the PE itself or in its LMIU. In this case, there is no translation table or logic in the DMA lane controllers. In common with the preceding approach, there is a PE ID component of the DMA bus which is driven by the transfer controllers and used by the LMIUs to compare for a match with the locally visible PE VID. When a match is detected in a PE, then it accepts the access which may be either a write or a read request. Means for updating the VIDs stored locally in the LMIUs may be provided through the use of registers visible in the PE register address space, or through a PE instruction which broadcasts the table to all PEs, who then select their VID using their hard-coded PID stored locally. This approach has advantages when VIDs are used for other purposes than just data distribution and collection by a DMA controller.

CTU Addressing Modes

A CTU 408 shown in FIG. 4 supports a basic set of address modes which may be used to target memories associated with each PE or SP individually. These address modes include single-address, block, stride and circular modes. These addressing modes will not be described in detail herein, but are a common set of addressing modes used for many uniprocessor applications. In addition to these address modes, the CTU 408 provides a set of "PE address modes" which allow data to be distributed across or collected from multiple PE memories in a variety of patterns. These address modes are based on a software model of address generation based on parameterizable loops, which is then implemented in hardware.

Flexible PE Addressing Modes through Parameterizable Logical Loops

Many algorithms which are distributed across multiple PEs require complex data access patterns to achieve peak efficiency. The basis for our loop-based PE addressing modes is a logical view of data access consisting of a set of nested loops in which one component of the PE memory address is assigned to be updated at the end of each loop. As stated above, a PE memory address consists of three components called "address components", a PE virtual ID (VID), a base value (Base) and an index value (Index). This model requires the following: a mechanism for assigning address components to logical loops; a mechanism for initializing address components; and a mechanism for updating address components; and a mechanism for indicating a loop's exit condition.

Assignment of an address component to a loop specifies the order in which the three address components are updated. In an embodiment which uses a three-loop model, there are six possible orders for updating address components (i.e. six ways to re-order VID, Base and Index). The base and index components are defined to be ordered in this embodiment so that the index is always updated prior to the base, which reduces the number of possible orderings to three, since base and index are summed to form an offset into PE memory, allowing loop assignments that update the base before the index is redundant. An exemplary loop assignment is: update VID on inner loop; update index on middle loop; and update base on outer loop.

Thus, as PE addresses are generated, the VID component updates first (inner loop). When all VIDs have been used (VID loop exit condition has been reached), then the VID is reinitialized, the index is updated, and the VID loop is reentered. This looping continues until the number of index updates is exhausted (Index loop exit condition has been reached) at which point the index is reinitialized, the base is updated, the index loop is reentered, then the VID loop is reentered. This further looping continues until the transfer count is exhausted.

Updating an address component is performed by selecting a new value for the component either based on the old value (e.g. new=old+1) or by some other means, such as by table lookup. A loop exit condition specifies what causes the loop to exit to the next-most outer loop in the model.

In summary, three different aspects of loop control are used to vary the sequence in which PE memories may be accessed. These are:

(1) Rearranging the order of assignment of address components to logical loops, (2) Varying the method for updating the address components, and (3) Varying the loop termination conditions.

Figure 10:
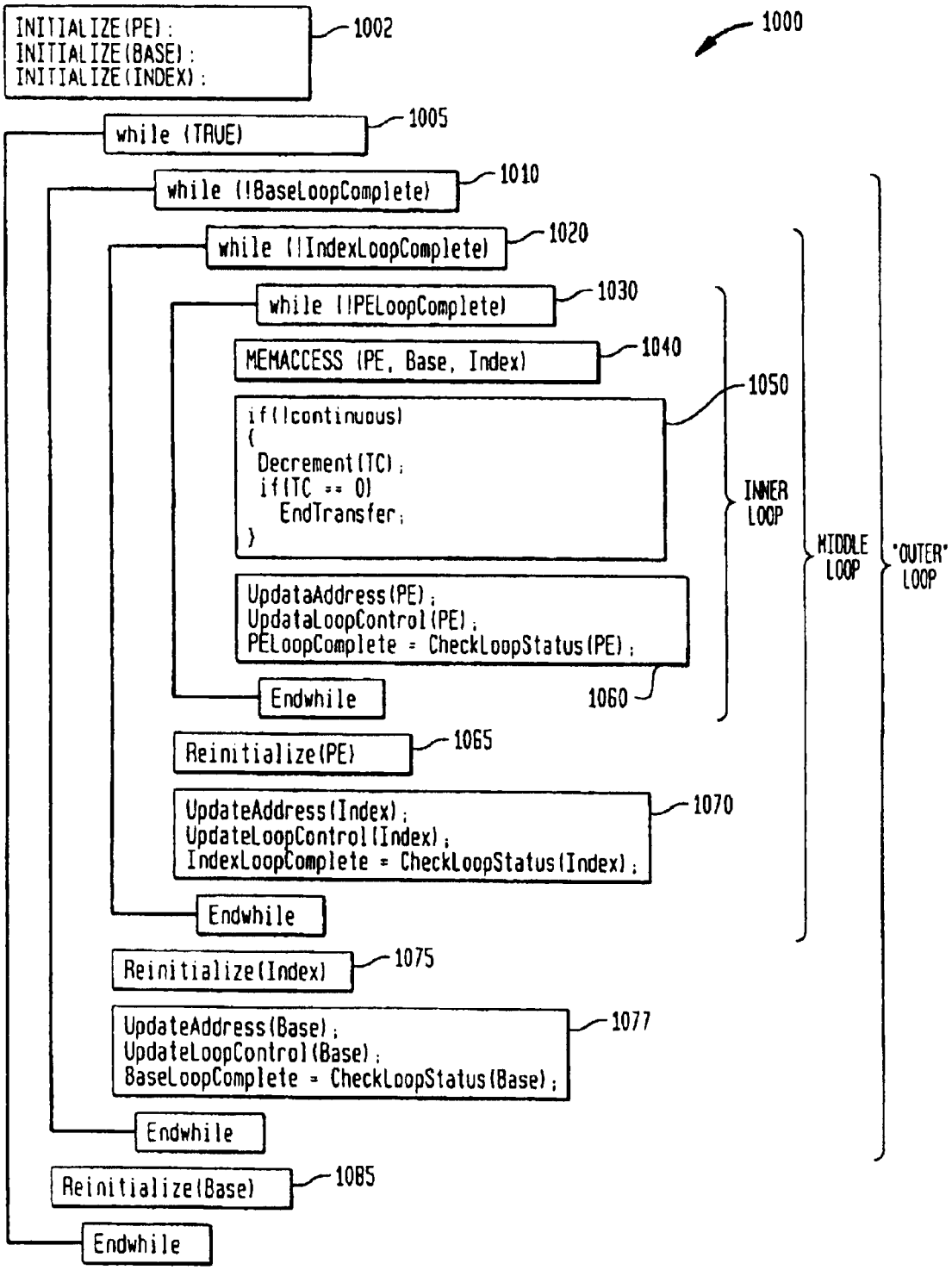
FIG. 10 illustrates a nested logical loop model showing a "BIP" assignment of address components to loops: base (outer), index (middle) and PE VID (inner)
Figure 11:
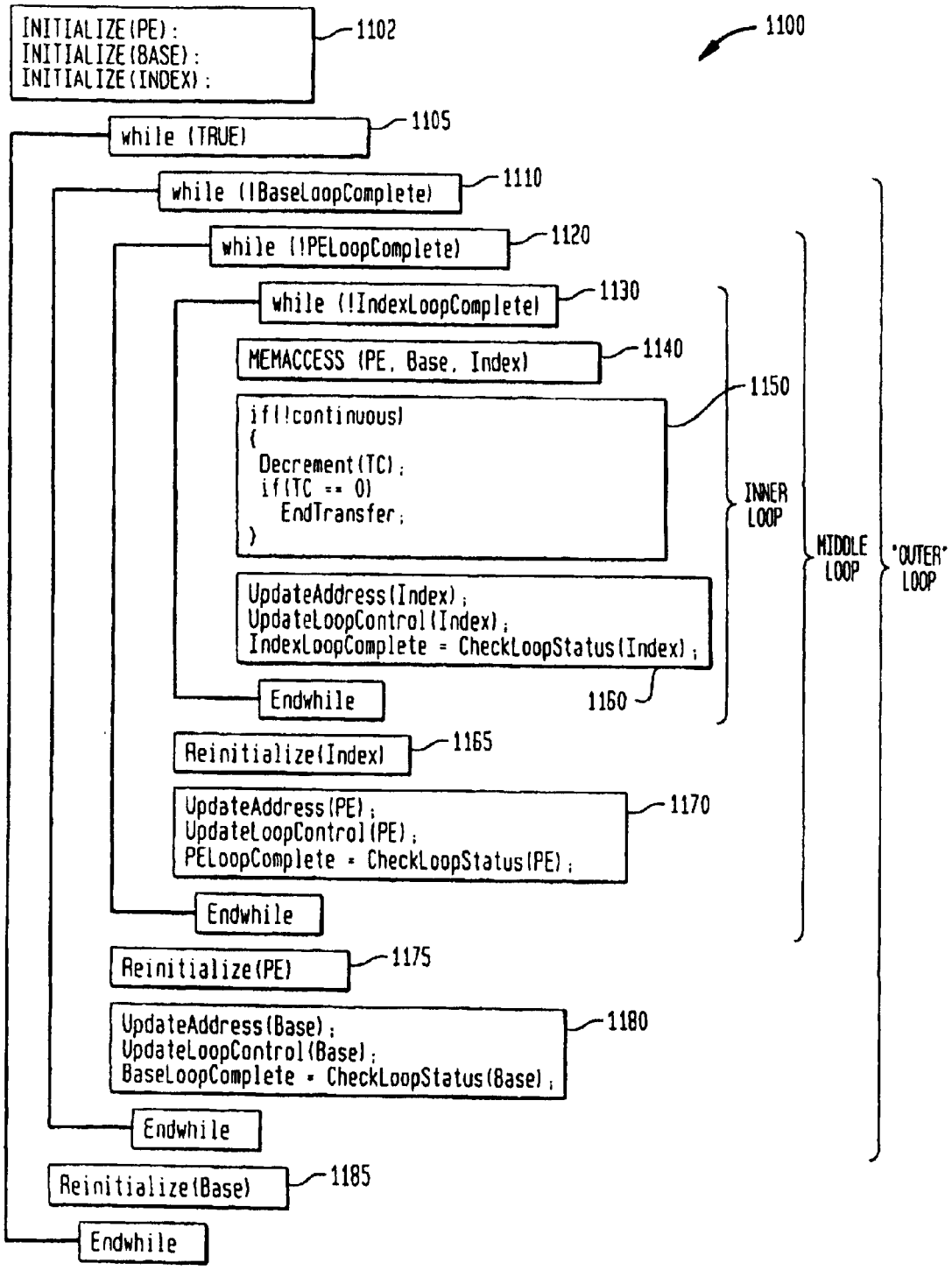
FIG. 11 shows a nested logical loop model with "BPI" assignment of address components to loops: base (outer), PE (middle) and index (inner)
Figure 12:
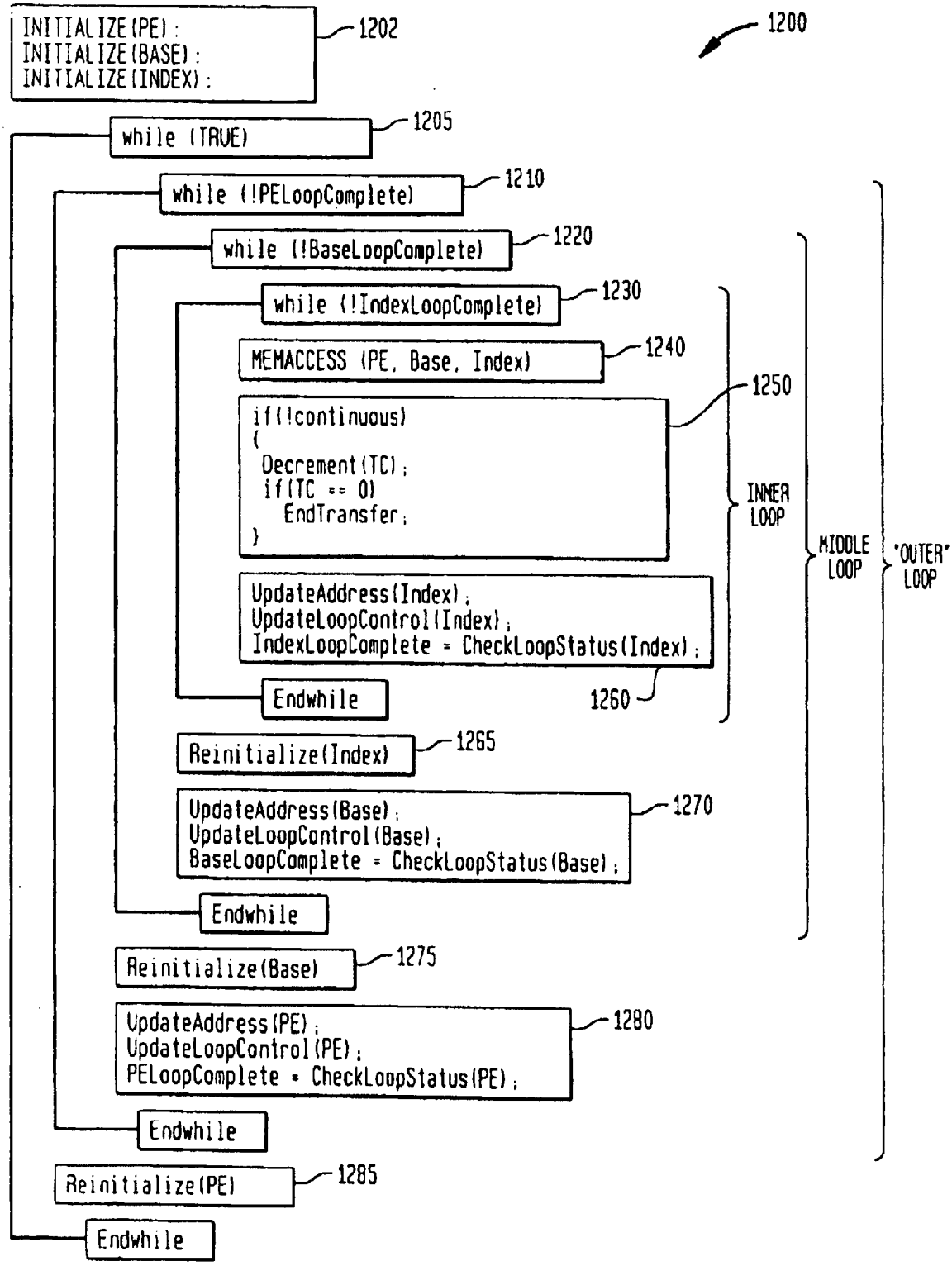
FIG. 12 is a nested logical loop model showing a "PBI" assignment of address components to loops: PE (outer), Base (middle) and Index (inner)

FIGS. 10, 11 and 12 show logical representations or processes 1000, 1100 and 1200, respectively, of preferred assignments of address parameters (PE VID, Base and Index) to logical loops. In the nomenclature used in FIGS. 10, 11 and 12, the term "PE" refers to the PE VID component of a PE address. In FIG. 10, the address components are assigned in "Base, Index, PE" (BIP) ordering. This means that the PE is updated in the innermost loop, the index parameter is updated in the "middle" loop and the base parameter is updated in the "outer" loop. In FIG. 11, the loop assignments are in a "Base, PE, Index" (BPI) ordering, and in FIG. 12, the loop assignments are in a "PE, Base, Index" (PBI) ordering.

FIG. 10 shows a logical representation 1000 of the nested loop model in which the PE VID is updated in an inner loop 1030, the index is updated in a middle loop 1020, and the base is updated in an outer loop 1010. A fourth loop 1005 which encompasses the other three loops indicates that the other loops are continued until the number of data elements specified in the transfer instruction have been accessed. Associated with each loop is a condition for loop exit 1010, 1020 or 1030, respectively, where the "!" character represents a logical NOT. Also associated with each loop is a mechanism 1060, 1070 or 1077, respectively, for updating the loop address parameter and for testing the updated value to indicate whether the exit condition for that loop has become TRUE. Prior to starting any loop is an address initialization block 1002 which sets the starting values of each address component (PE, Base and Index). The data transfer implemented by FIG. 10 will cause PEs to be accessed first until an "exit PE loop" condition has become true (PELoopComplete is TRUE), at which point the PE loop exits and the PE parameter is reinitialized in step 1065. The index parameter is then updated and tested for its terminal condition in step 1070. If the index parameter's terminal condition has not become TRUE, then the PE loop is reentered. When the index parameter's terminal condition becomes TRUE, the index loop is exited, the index parameter is reinitialized in step 1075 and the base parameter is updated and tested for a terminal condition in step 1080. If the base parameter terminal condition has not been reached, then the index and PE loops are reentered and executed until either all data items have been accessed (transfer count specified in the transfer instruction becomes zero) or the index loop is terminated again. When BaseLoopComplete becomes TRUE, the base value is reinitialized in step 1085 and the loops are reentered again.

FIGS. 11 and 12 show nested logical loops or processes 1100 and 1200 corresponding to "BPI" access (index is updated first, followed by PE, followed by base) and "PBI" access (Index is updated first, followed by Base, then lastly PE) respectively.

The following aspects of the loop formulation are noted. When the requested number of accesses are made (TC in FIGS. 10–12) then all loops are exited immediately, leaving all address and loop control variables in their current states. By using logical "while" loops and reinitializing a loop only at its exit, it is possible to reenter the loops and continue a transfer after "terminal count" (TC) addresses have been accessed. This capability is used in this invention to allow transfers to be restarted so that the addressing continues as though it would if the transfer count had not been exhausted. For further details of such transfers see U.S. application Ser. No. 09/471,217 filed Dec. 23, 1999, now U.S. Pat. No. 6,260,082, which is incorporated by reference in its entirety herein.

The functions used to update an address (see UpdateAddress( ) in FIG. 10 steps 1060, 1070 and 1077; in FIG. 11 steps 1160, 1170 and 1177; and in FIG. 12 steps 1260, 1270 and 1277) may update the address using a constant increment value, or a value extracted from a table, or use a selection mechanism based on a bit vector. While other UpdateAddress( ) functions might be supported, those listed are supported in the presently preferred embodiment.

The function used to update the loop control variable, UpdateLoopControl( ), may be performed as part of the address update or as a separate operation as shown in FIGS. 10–12. This operation is used to update variables which control loop termination. In the preferred embodiment, the control variables are counters or special logical functions consisting of priority encoders and counter blocks.

The function used to check for loop termination simply tests the loop termination variable for an end of loop condition. This condition may be a particular count value or the state of a mask register.

The initialization of address parameters (see Initialize( ) function: FIG. 10 1002, FIG. 11 1102, and FIG. 12 1202) does not necessarily occur each time a transfer is started. In the preferred embodiment, this initialization occurs only when a transfer instruction is decoded and parameters are loaded into CTU registers in the case of PE addressing modes or STU registers.

The following discussion addresses instruction formats and describes PE addressing modes for one embodiment of the invention. It will be recognized other instruction encodings may be used consistent with the teachings of the present invention. In the preferred embodiment, a transfer controller reads transfer instructions from a local memory and decodes them. Transfer instructions come in two types, those for the STU and those for the CTU. The STU transfer instructions specify the addressing mode and transfer count for accesses to the system data bus while CTU transfer instructions specify the addressing mode and transfer count for accesses to the DMA bus and all SP and PE memories. The instruction formats addressed below are only those instructions which control special PE memory addressing for the CTU. Instruction mnemonics are used to indicate the instruction type and addressing mode. "TCI" stands for "transfer, core-inbound", while "TCO" stands for "transfer, core-outbound". "TCx" stands for either TCI or TCO. The following PE addressing modes are described as illustrative of the present invention: PE Block-Cyclic, PE Select-Index, PE Select-PE, and PE Select-Index-PE.

PE Block-Cyclic Addressing

PE blockcyclic addressing provides the basic framework for all of the PE addressing modes. A Loop parameter specifies the assignment of address components to loops: BIP, BPI, or PBI. FIG. 13 shows an exemplary format 1300 which defines the parameters for a PE Blockcyclic transfer instruction executed by the CTU. As an example, if we are given:

- An inbound sequence of 16 data elements with values 0,1,2,3, . . . 15;
- PETABLE setting of 0×000000E4 (no translation of PE IDs);
- TSI.block instruction in the STU (reading the 16 values from system memory); and
- TCI.blockcyclic instruction in the CTU with PE count=4, Base Update=8, Base Count=2 (used for PBI mode only), Index Update=2, Index Count=2, then the resulting data in the PE memories 1400 after the transfer are shown in FIG. 14 for BIP loop assignment. FIG. 15 shows resulting data 1500 for BPI loop assignment. FIG. 16 shows resulting data 1600 for PBI loop assignment.

PE Select-Index Addressing

The operation of the PE select-index address mode is similar to the PE blockcyclic address mode except that rather than updating the index component of the address by adding a constant to it, the instruction specifies a table of index update values which are used sequentially to update the index. FIG. 17 shows an exemplary instruction format 1700 for the PE select-index instruction.

An index select parameter allows finer-grained control over a sequence of index values to be accessed. In the example, this is done using a table of eight 4-bit index-update (IU) values. Each time the index loop is updated, an IU value is added to the effective address. These update values are accessed from the table sequentially starting from IU0 for IUCount updates. After IUCount updates, the index update loop is complete and the next outer loop (B or P) is activated. On the next entry of the index loop, IU values are accessed starting at the beginning of the table. FIG. 18 shows an exemplary data access table 1800 illustrating data access using the PE select-index instruction.

PE Select-PE Addressing

The operation of the PE Select-PE address mode is similar to the PE blockcyclic address mode except that rather than updating the PE VID component of the address by adding 1 to it, the instruction specifies a table of bit vectors, where each bit vector specifies the PE's to select for access. A bit set to "1" in a bit vector indicates, by its bit position, the VID of the PE to access. Bits in each bit vector are scanned from right to left (least to most significant when viewed in a first instruction format such as instruction format 1900 of FIG. 19). When there are no more "1" bits in a vector, the PE loop exits. The next iteration of the loop uses the next bit vector in the table. FIG. 19 shows an exemplary instruction formal 1900, and FIG. 20 shows an exemplary transfer data access table 2000 for a transfer using this instruction.

The PE select fields together with the use of the PE translate table allow out of order access to PEs across multiple passes through them.

PE Select-Index-PE Addressing

This addressing mode combines both select-index and select-PE addressing. An exemplary instruction format 2100 is shown in FIG. 21. This form of addressing provides for complex-periodic data access patterns. An exemplary access pattern table 2200 for the PE-select-index-PE address mode is shown in FIG. 22.

I claim:

[1. An apparatus for performing virtual identification (VID) to physical identification (PID) translation for data elements to be accessed within local memory of a processing element (PE) whereby a direct memory access (DMA) controller can access PE local memories according to their VIDs, the apparatus comprising:

an array of multiple PEs each having local PE memory;

a DMA controller; and a memory maintained in the DMA controller for storing a processing element VID-to-PID table mapping processing element VIDs to processing element PIDs utilized by the DMA controller to access local memories according to their VIDs.]

[2. The apparatus of claim 1 wherein said memory is maintained in a core transfer unit of the DMA controller.]

[3. The apparatus of claim 2 wherein the core transfer unit (CTU) further comprises an address generation unit (AGU) which receives a CTU transfer instruction which specifies a starting address which is used by the AGU to generate an initial VID.]

[4. The apparatus of claim 3 wherein the initial VID controls the selection of one of the elements of the VID-to-PID lookup table through a multiplexer.]

[5. The apparatus of claim 4 further comprising a DMA bus for providing the selected PID as a first component of a PE address.]

[6. The apparatus of claim 5 wherein the AGU further operates to generate a PE memory offset which is sent as a second component of a PE address on the DMA bus.]

[7. The apparatus of claim 6 further comprising a local memory interface unit (LMIU) which is used to compare the PID sent on the DMA bus to a stored PID for any DMA access, if a match is detected then the LMIU accepts the access.]

[8. The apparatus of claim 3 wherein successive VIDs are generated in recursive fashion by the AGU.]

[9. The apparatus of claim 3 wherein successive VIDs are generated in recursive fashion by the AGU, and further comprising:

a local memory interface unit for each processing element (PE) storing a VID for each PE.]

[10. The apparatus of claim 9 wherein a VID available to a particular LMIU or a DMA bus is compared with the stored VID in the LMIU and where a match occurs the LMIU accepts the access.]

[11. The apparatus of claim 1 wherein the VID-to-PID table is stored in a programmable register and the programmable register is loaded utilizing a DMA instruction.]

[12. The apparatus of claim 1 wherein the VID-to-PID table is stored in a programmable register and the programmable register loaded utilizing a direct write to the programmable register.]

[13. A processing apparatus comprising:

a plurality of processing elements (PEs) communicatively connected by a bus, each PE comprising a register storing a virtual identification number (VID) identifying the PE; and a direct memory access (DMA) controller connected to the bus for accessing local data memory of the PEs, each data access at least partially identified by a VID;

wherein during a common data to access multiple PEs, a PE responds to the data access if the VID stored in the register matches the VID of the data access.]

[14. The processing apparatus of claim 13 wherein each PE comprises a local memory interface unit (LMIU) which includes the register storing the VID.]

[15. The processing apparatus of claim 13 wherein the data access is a read access.]

[16. The processing apparatus of claim 13 wherein the data access is a write access.]

[17. The processing apparatus of claim 13 further comprising: means for updating the register.]

*18. An apparatus for accessing local memory of a plurality of processing elements (PEs), the apparatus comprising:*

*a transfer controller running a process containing a set of nested loops, the set of nested loops having a plurality of parameters to be specified by a transfer instruction, the plurality of parameters, when assigned, control PE selection and address generation for accessing a memory location in local memory of each selected PE; and*

*a means for receiving the transfer instruction for transferring data between system memory and local memory of the plurality of PEs, the transfer instruction having fields which specify values for the plurality of parameters, the transfer instruction indicating an addressing mode, the addressing mode specifying a particular pattern of accessing local memory of the plurality of PEs, wherein the transfer controller decodes the transfer instruction to assign values to the plurality of parameters, the process generating addresses for accessing a memory location in local memory of each selected PE in a particular pattern, wherein the particular pattern is based on the assigned parameters.*

*19. The apparatus of claim 18 wherein the means for receiving a transfer instruction is an instruction control unit.*

*20. The apparatus of claim 18 wherein the means for receiving a transfer instruction is a core transfer unit reading instructions from a memory attached to a direct memory access (DMA) bus.*

*21. The apparatus of claim 18 wherein the means for receiving a transfer instruction is a system data bus connected to the transfer controller and system memory.*

*22. The apparatus of claim 18 wherein the transfer instruction specifies a block cyclic addressing mode.*

*23. The apparatus of claim 18 wherein the transfer instruction specifies a PE select index addressing mode.*

*24. The apparatus of claim 18 wherein the transfer instruction specifies a select PE addressing mode.*

*25. The apparatus of claim 18 wherein the transfer instruction specifies a select index PE mode.*

*26. A method of accessing local memory of a plurality of processing elements (PEs), the method comprising:*

*receiving a transfer instruction for transferring data between system memory and the local memory of a plurality of processing elements (PEs);*

*running a process containing a set of nested loops, the set of nested loops having a plurality of parameters to be assigned values of fields carried in the transfer instruction;*

*decoding the transfer instruction to assign field values to the plurality of parameters;*

*assigning the field values to the plurality of parameters in order to control PE selection and address generation for accessing a memory location in local memory of each selected PE; and*

*generating addresses to access local memory of each PE in a defined pattern.*

*27. The method of claim 26 wherein the transfer instruction specifies a block cyclic addressing mode.*

*28. The method of claim 26 wherein the transfer instruction specifies a PE select index addressing mode.*

*29. The method of claim 26 wherein the transfer instruction specifies a select PE addressing mode.*

*30. The method of claim 26 wherein the transfer instruction specifies a select index PE mode.*

* * * * *